(12) United States Patent
Paek et al.

(10) Patent No.: US 8,264,397 B2
(45) Date of Patent: Sep. 11, 2012

(54) TIME TRANSFER METHOD AND SYSTEM

(75) Inventors: Eung Gi Paek, Germantown, MD (US); Joon Y Choe, Potomac, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 12/911,817

(22) Filed: Oct. 26, 2010

(65) Prior Publication Data
US 2012/0098697 A1    Apr. 26, 2012

(51) Int. Cl.
*G01S 13/00* (2006.01)
(52) U.S. Cl. .......................................... 342/31; 342/145
(58) Field of Classification Search .................... 342/31, 342/145
See application file for complete search history.

(56) References Cited

U.S. PATENT DOCUMENTS

| | | | |
|---|---|---|---|
| 4,021,804 A | 5/1977 | Dounce et al. | |
| 5,361,277 A | 11/1994 | Grover | |
| 5,818,371 A | 10/1998 | Lu et al. | |
| 6,297,765 B1 | 10/2001 | Frazier et al. | |
| 6,995,705 B2 | 2/2006 | Bradford et al. | |
| 7,148,839 B2 | 12/2006 | Chen | |
| 7,589,665 B2 | 9/2009 | Heide et al. | |
| 2005/0128135 A1 | 6/2005 | Hester et al. | |
| 2010/0290517 A1* | 11/2010 | Lee et al. | 375/239 |

OTHER PUBLICATIONS

U.S. Appl. No. 12/948,841, Paek et al.

* cited by examiner

*Primary Examiner* — Timothy A Brainard
(74) *Attorney, Agent, or Firm* — Amy L. Ressing; L. George Legg

(57) ABSTRACT

A Time Transfer Time Reverse Mirror (TT TRM) method and system includes a radio transceiver for transmitting a series of short pulses repeatedly at a period T and for receiving from a remote node a return signal that is a retransmission of the original signal at the same period T: a clock circuit for inputting a clock signal to the transceiver: and a computer for (i) computing and generating an imaginary time-reversed signal version of the original signal, (ii) comparing the return signal with the imaginary version, (iii) computing a delay between the return signal and the imaginary version that is substantially equal to twice the time difference between the two nodes, and (iv) applying the computed delay to a clock input calibration for a desired signal. The system includes time transfer using the ionospheric reflection (refraction), producing precise synchronization among remote nodes beyond the line-of-sight and thus without necessitating GPS or communication satellites.

9 Claims, 8 Drawing Sheets

TIME TRANSFER METHOD AND SYSTEM

CROSS-REFERENCE TO RELATED APPLICATIONS

The present application is related to U.S. patent application Ser. No. 12/948,841, filed on Nov. 18, 2010.

FIELD OF THE INVENTION

The invention is directed to a method and system for synchronizing a clock employing time transfer with a time reverse mirror, and more particularly, to computing a delay between a return signal and an imaginary time-reversed signal and applying the computed delay to a clock input calibration for a desired signal such as a multistatic radar signal.

BACKGROUND OF THE INVENTION

A bistatic radar is a radar with transmit and receive antennas separated by a considerable distance with respect to target range. In recent years, these bistatic and multistatic radars are gaining more and more attention because they can provide low-cost, ECCM capabilities against stealth targets.

Due to the geometry of bistatic or multistatic radars, e.g. such as described in U.S. Patent Application No. 20060202885, "Operational Bistatic Radar System Synchronization," P. Chen. Sep. 14, 2006, incorporated herein by reference, which describes a direct line-of-sight (LOS) connection employing QPSK bit synchronization, the synchronization of time and frequency at the transmitters and receivers is a crucial problem for coherent signal processing and range measurement. The coherent integration of signals from remote nodes for cohere-on-transmit and cohere-on-receive require very stringent and hard phase locking and synchronization. Typically, the remote nodes must be synchronized to less than a few percent of a carrier frequency. Also, the clock at each node must be phase locked not to cause drift of the summed signals during the coherent integration time. These become even more difficult when the nodes are on a moving platform as in the case of synthetic aperture radar (SAR).

When the nodes are separated by a line-of-sight distance, direct measurements using hard-wired cables (fiber-optic or RF) or free-space (free-space optics or free-space RF wave) communications are used to achieve synchronization on the order of ns.

When the nodes are separated beyond the line-of-sight, satellites are required. Rubidium or quartz clocks using four or more GPS space vehicles, e.g. such as described in U.S. Pat. No. 6,995,705, "System And Method For Doppler Track Correlation For Debris Tracking", Bradford et al., 2006, incorporated herein by reference, are most commonly used to achieve synchronization of remote nodes to tens of ns. However, in adverse environments with multipath interference or moving platforms, performances become significantly degraded. Furthermore, timing depends on propagation delays which depend on sensor locations. To extract the desired timing portion from the measurements, precise location is also necessary. Other representative bistatic or multistatic radar systems that employ direct LOS include: U.S. Patent Application No. 20050128135, "Remote Phase Synchronization Using A Low-Bandwidth Timing Referencer", Hester et al., Jun. 16, 2005; U.S. Pat. No. 4,021,804, "Synchronized, Coherent Timing System For Coherent-On-Receive Radar System", Eric A. Dounce, May 3, 1977; U.S. Pat. No. 5,361,277, "Method And Apparatus For Clock Distribution And For Distribuuted Clock Synchronization", Wayne D. Grover, Nov. 1, 1994; U.S. Pat. No. 6,297,765, "Bistatic Passive Radar System With Improved Ranging", Lawrence M. Frazier, Oct. 2, 2001; U.S. Pat. No. 7,589,665, "Multistatic Method And Device For Radar Measuring A Close Distance", P. Heide et al., Sep. 15, 2009; and U.S. Pat. No. 5,818,371, "Coherent Synchronization And Processing Of Pulse Groups", C. Lu et al., Oct. 6, 1998, all of which are incorporated herein by reference.

Time transfer is a method for transferring a reference clock from one point to another over a long distance. Due to the recent advances in global positioning system, navigation, etc., time transfer has become an important element. Various methods of time transfer have been developed over many years including one-way transfer, two-way transfer, and common view transfer. However, these methods lack precision mainly due to the incomplete cancellation of propagation delays.

BRIEF SUMMARY OF THE INVENTION

According to the invention, a Time Transfer Time Reverse Mirror (TT TRM) method and system includes a radio transceiver for transmitting a series of short pulses repeatedly at a period T and for receiving from a remote node a return signal that is a retransmission of the original signal at the same period T; a clock circuit for inputting a clock signal to the transceiver; and a computer for (i) computing and generating an imaginary time-reversed signal version of the original signal, (ii) comparing the return signal with the imaginary version, (iii) computing a delay between the return signal and the imaginary version that is substantially equal to twice the time difference between the two nodes, and (iv) applying the computed delay to a clock input calibration for a desired signal.

The invention is directed to a time-transfer method and system using time reversal. By operating time reversal repeatedly at a pre-defined period, one can transfer time with high precision, without being affected by the delays caused by propagation, multipath and instruments, permitting time transfer anywhere within the reach of radio signals.

Compared with other existing time transfer methods, TT-TRM has the following advantages: simple and low cost; high precision due to better cancellation of propagation delays; and, no satellite required; no communications between CO and each node is required.

Also, multiple nodes can be supported by a single TRM at CO, whereas with single frequency—TWSTF uses two different frequencies that can propagate along different paths, making cancelation of propagation delay difficult.

The invention has application in bistatic and multistatic passive radars. These radars are coherently combined to produce optimized performance at both transmitter (cohere on transmit) and receiver sides (cohere on receive). Also, time delay of arrival and angle of arrival measurements require precise synchronization among nodes.

The invention differs from conventional approaches in that it utilizes time reversal to extract the purely timing portion by substantially nulling out other effects such as propagation delays, distortion or dispersion. Therefore, it can be used for any environments such as multipath, moving platform, or even ionospheric propagation that consists of multiple layers (D, E, F1 and F2, etc.), multiple heights (low and high), multiple hopping, and two different polarization modes. The invention also includes time transfer using the ionospheric reflection (refraction), producing precise synchronization among remote nodes beyond the line-of-sight and thus without necessitating satellites (GPS or communication satellites).

DETAILED DESCRIPTION OF THE INVENTION

Figure 1:
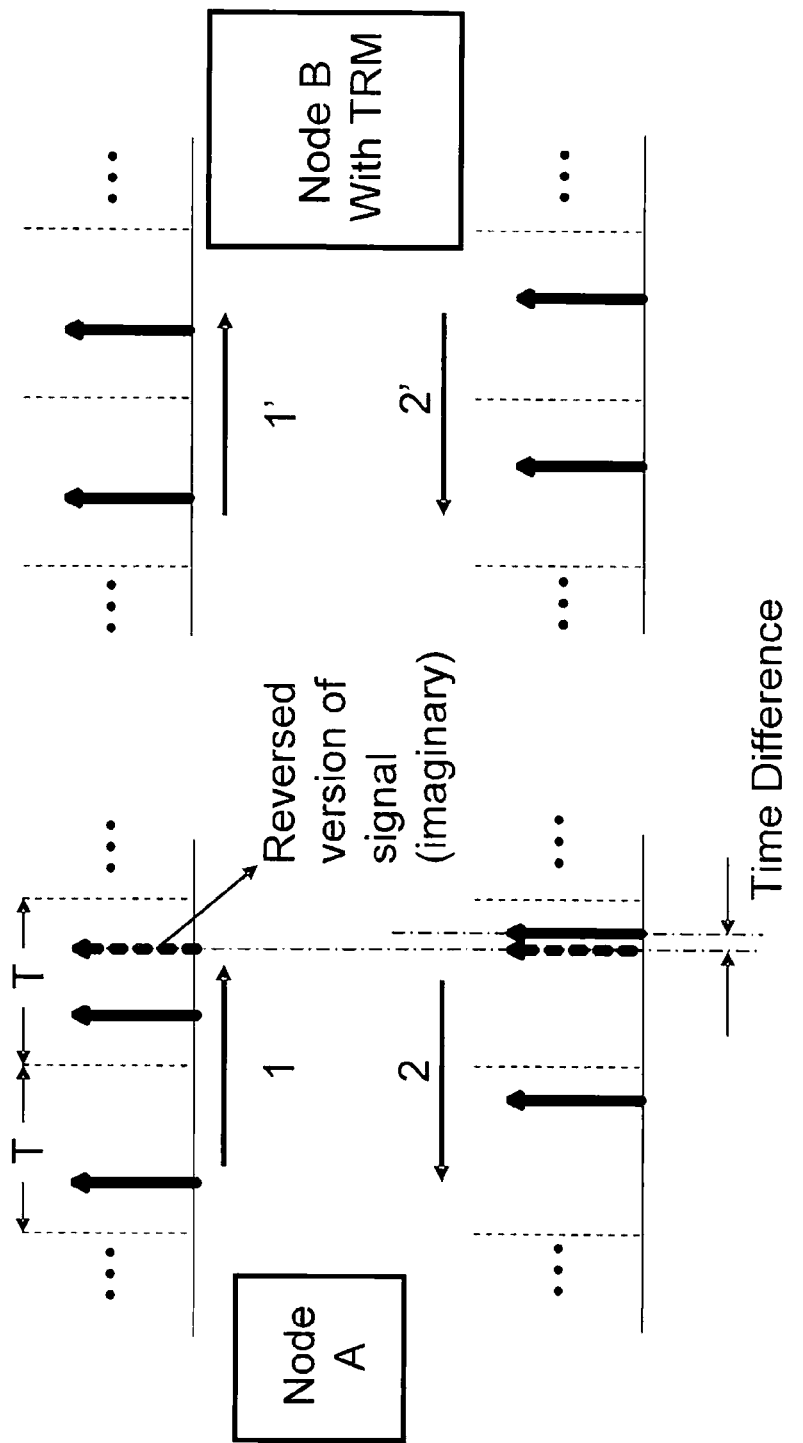
FIG. 1 is a schematic diagram illustrating the operational principle of time transfer using a time reversal mirror (TT TRM) according to the invention.

The operational principle of time transfer using a time reversal mirror (TT-TRM) is simple, as shown in FIG. 1. At first, Node A sends out a series of short pulses repeatedly at a period T. Node B receives, time reverses, and retransmits the incoming signals at the same period. At Node A, the returned signal is compared with the imaginary time-reversed version of the original signal (shown with a dotted red vertical line). The delay between the two pulses measured at Node A is twice the time difference between the two nodes. This amount of time is independent of various propagation delays due to the unique feature of time reversal, as explained below in detail.

Figure 2:
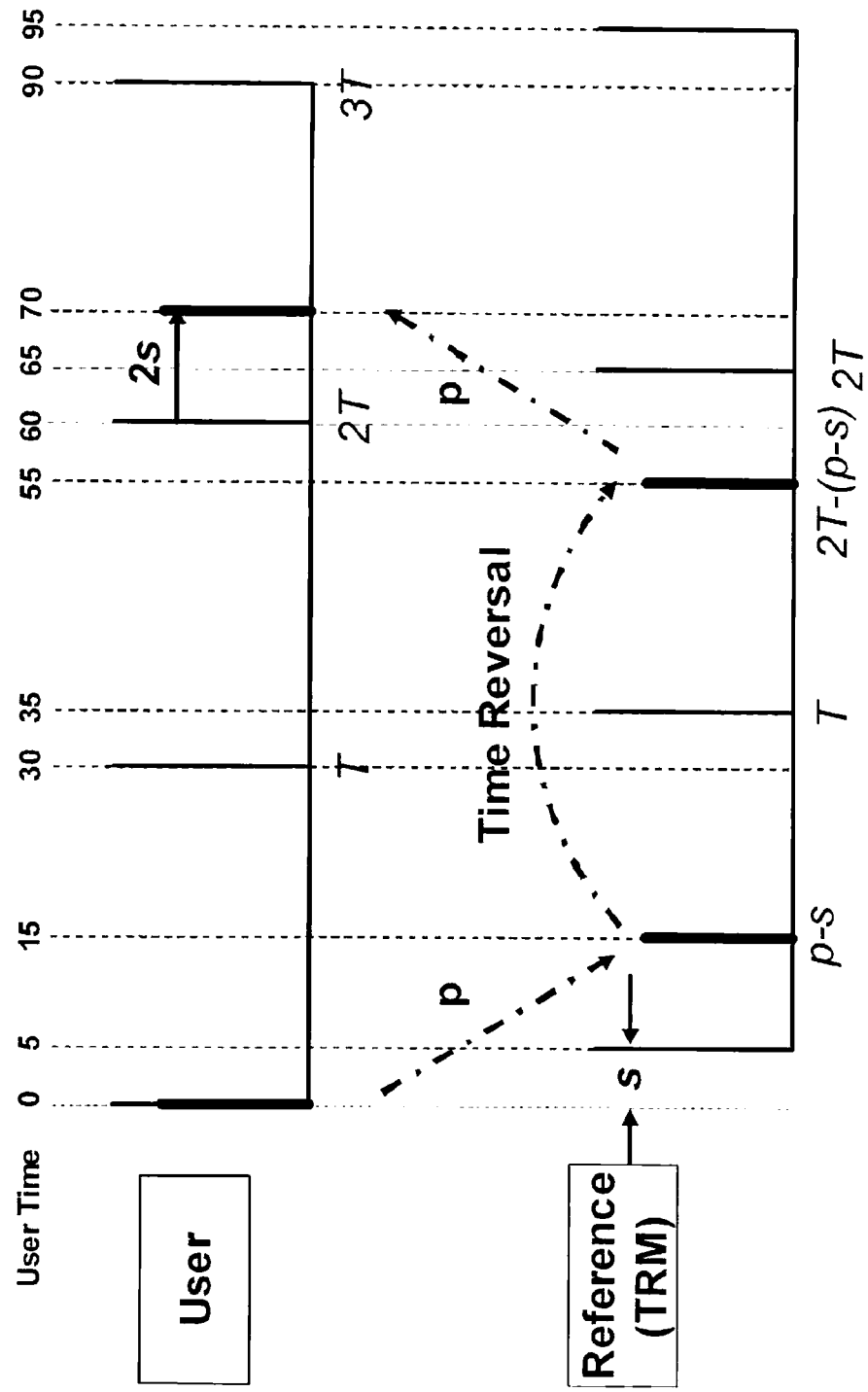
FIG. 2 is a schematic diagram illustrating the time difference determination between two nodes being independent of various propagation delays according to the invention.

FIG. 2 explains how the amount of time delay between the transmitted and returned pulses measured at User node is solely dependent on the time difference between the two nodes—User and Reference nodes—and is independent of various propagation delays and multipath effects.

In the example shown in the Figure, the following values are assumed: period T=30 sec, the time skew of the User node with respect to Reference node s=5 sec. and propagation delay between the two nodes p=15 sec. These numbers are exaggerated only for illustration. The time measured in User frame is shown on the top of the figure with vertical dotted lines.

A pulse signal (represented with a thick solid line) is transmitted from User node to Reference node at t=0 in User time. After p sec (at t=p=15 sec in User and t=p-s=10 sec in Reference time), the pulse arrives at Reference node. The signal is then time-reversed with respect to the axis at t=T=30 to t=2T-(p-s)=2*(30)-(15-5)=50 sec both in Reference time and is transmitted to User node. The retransmitted pulse after time-reversal arrives at User node at t=2T-(p-s)+p in Reference time or at t=2T-(p-s)+p+s=2T+2s in User time. Since each node updates its frame at a pre-defined period T, the User will measure the returned pulse at modulo(2T+2s, T)=2s (2*5=10 sec), which is twice the amount of skew s.

Here one should note that this temporal shift of 2*s is independent of the propagation delay p, even through a distorting medium or multipaths, since the propagation delay is canceled out by time reversal after the round trip.

Figure 3:
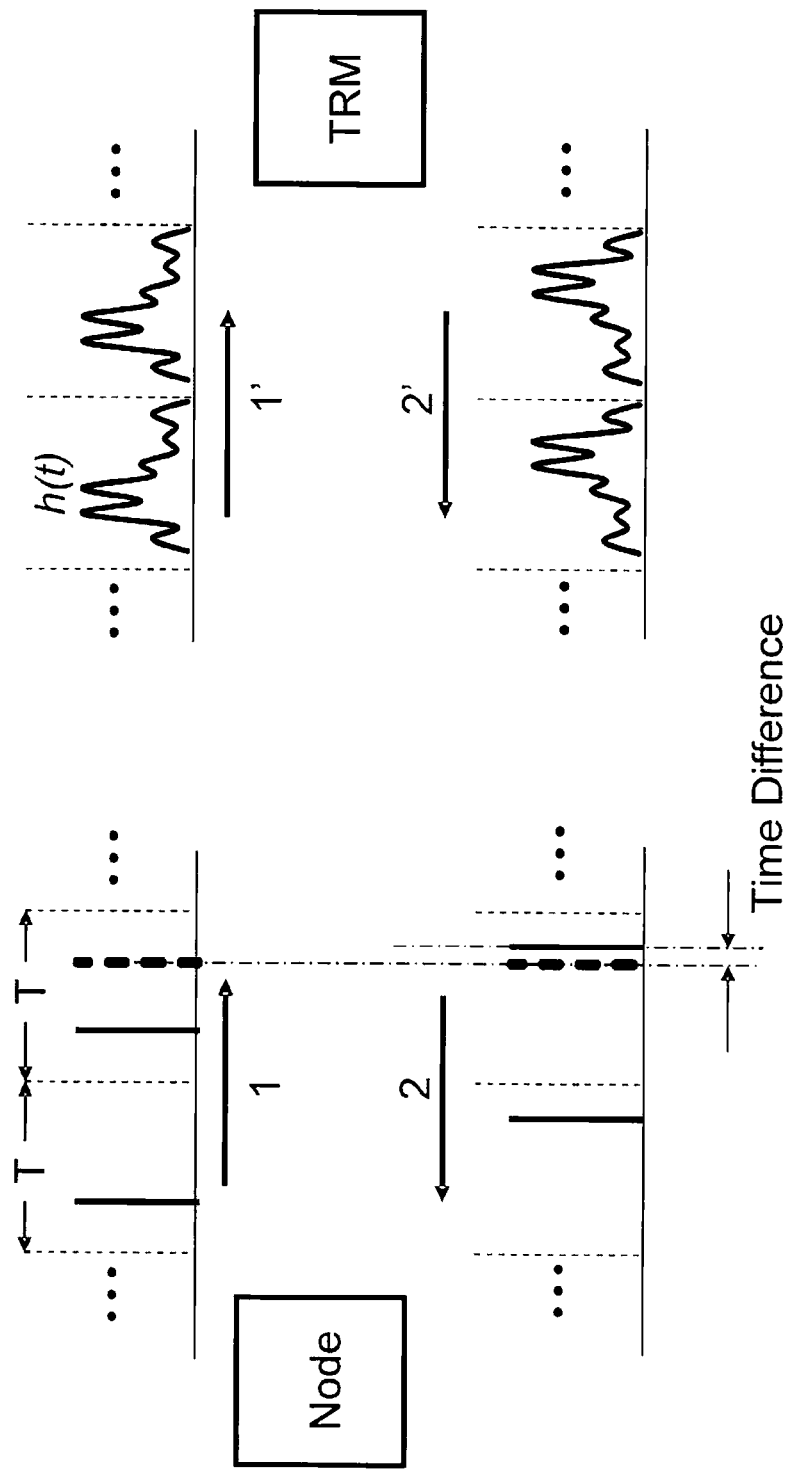
FIG. 3 is a schematic diagram illustrating the compensation for signal distortion according to the invention.

The invention compensates for signal distortion due to intermediate media such as ionosphere, troposphere and multipaths. As shown in FIG. 3, the initial short pulse (impulse) is distorted to h(t) (i.e. the impulse response of the propagating media and instruments). However, after time-reversal and re-transmission though the same medium, the waveform is refocused to a sharp peak. This autocorrelation has a maximum peak at the center and a symmetrical shape with respect to the center, allowing a precise location of the peak position. Unlike other time-transfer methods, an increase in distortion often contributes to a sharper peak in the present time-reversal system.

Figure 4:
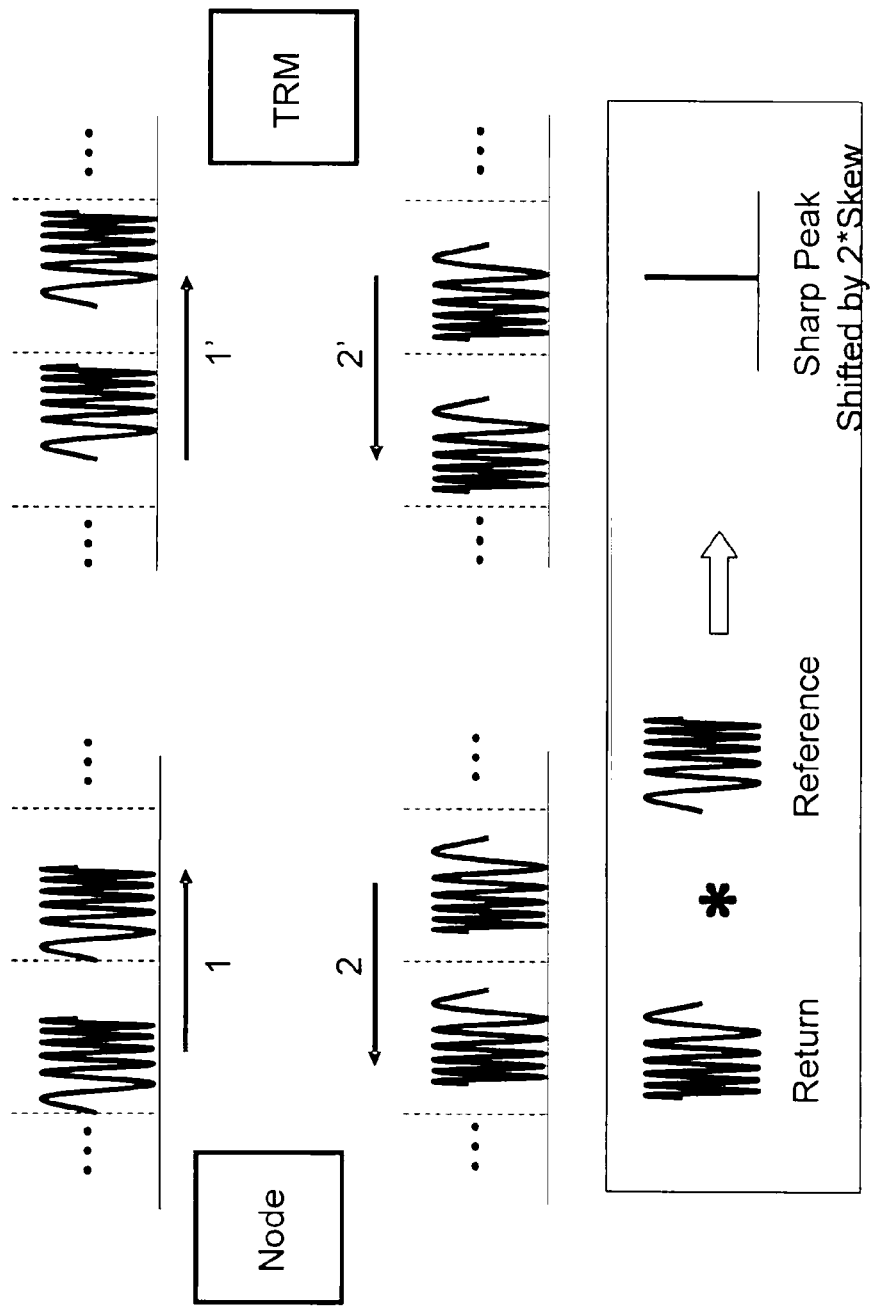
FIG. 4 is a schematic diagram illustrating the processing of continuous wave signals such as linear chirp or pseudo random noise signals commonly used in code-division multiple access (CDMA) according to the invention.

In order to avoid the need for high power pulse transmission, one can consider lower power continuous wave signals such as linear chirp or pseudo random noise signals commonly used in code-division multiple access (CDMA), as shown in FIG. 4. In this case, the received signal at Node A must be convolved (rather than correlated) with the original transmitted reference signal for pulse compression.

Figure 5:
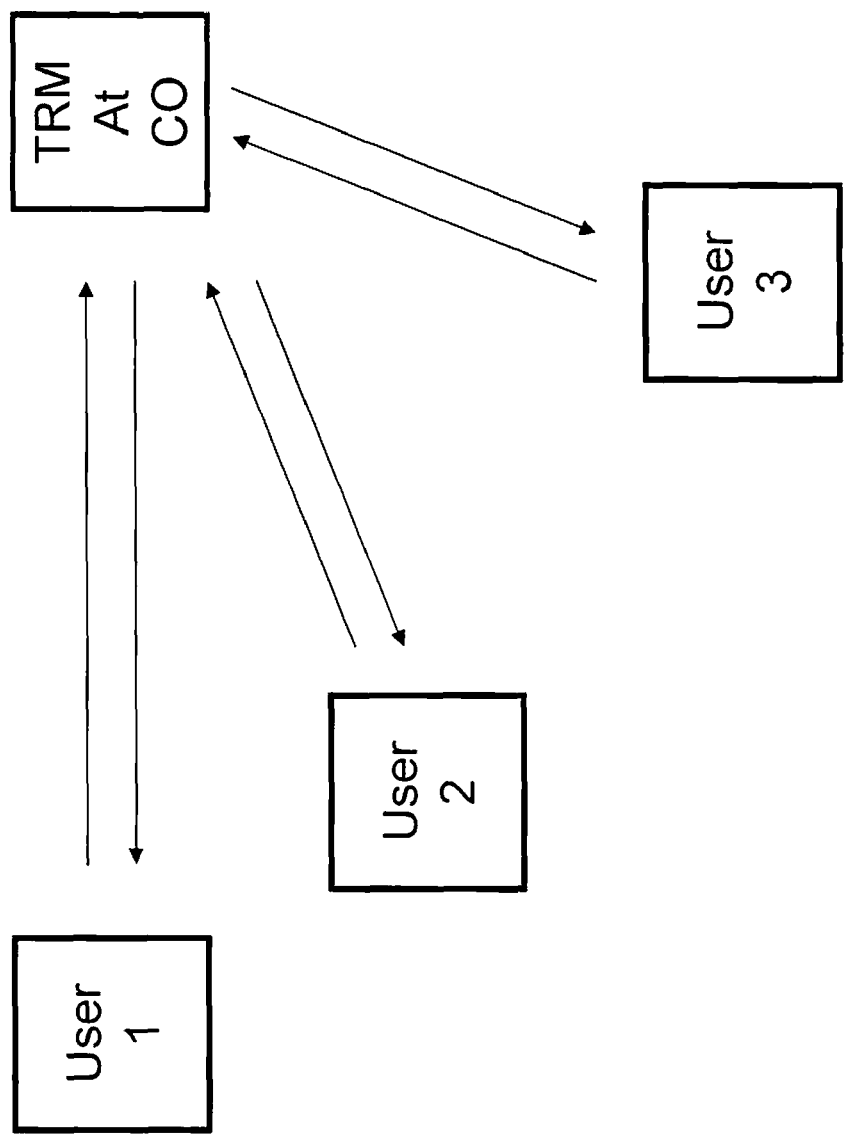
FIG. 5 is a schematic diagram illustrating the application of time transfer for multiple nodes (>2) according to the invention.

As shown in FIG. 5, time transfer can also be implemented in a large number of nodes, because the TRM at central office (CO) can operate independently without the need for communication or coordination with each node (like a satellite in GPS which supports multiple users), as long as the TRM is operated at the pre-defined period. In this case, to avoid the propagation of time-reversed signals from the CO to unwanted nodes (e.g. Node 1→TRM→Node 2), different frequencies can be used for different nodes. Also, when the CO has several TRM's, the selective beam focusing can be achieved on the transmitter, permitting the use of the same frequency among different nodes.

Figure 6:
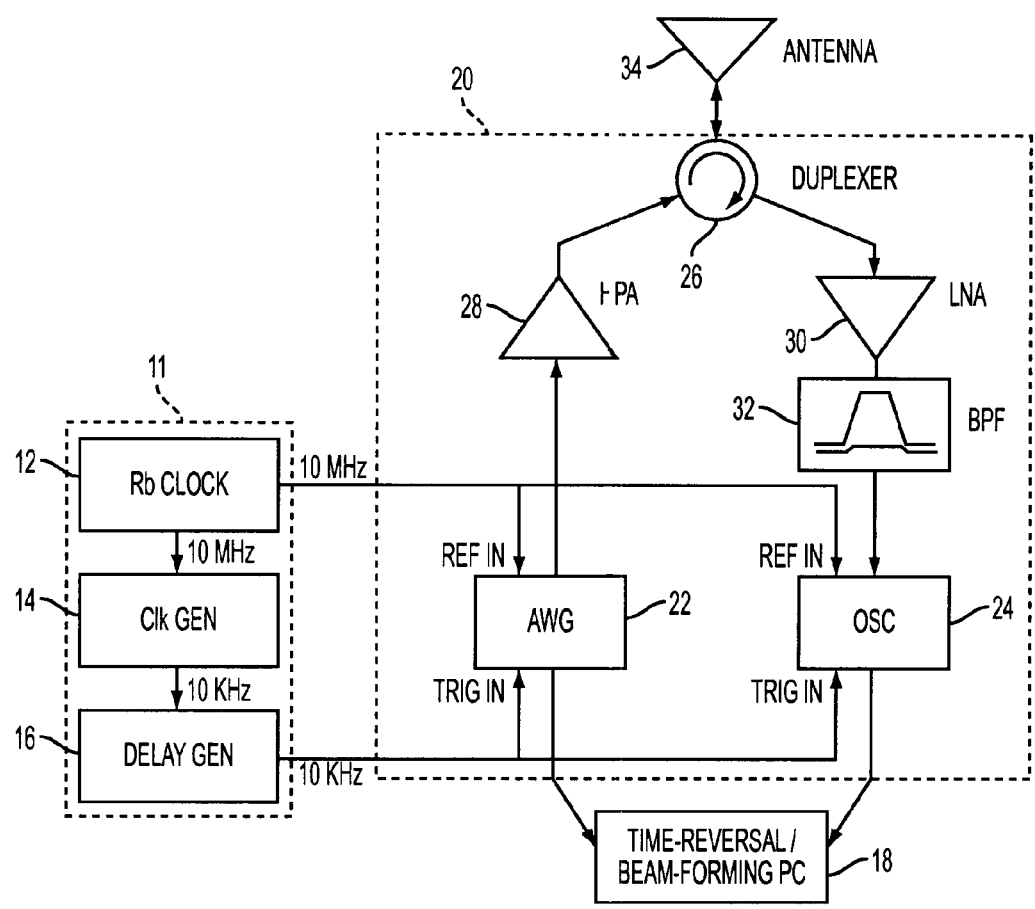
FIG. 6 is a schematic diagram of a TT TRM system according to the invention.

FIG. 6 shows a schematic diagram of a TRM system 10. A Rubidium (Rb) clock 12, a high precision clock generator 14, a delay generator 16, and a computer 18, including a machine-readable storage media 19 having programmed instructions stored thereon for computing and generating the time-reversed signal, are added to a conventional radio transceiver 20, which normally consists of an arbitrary waveform generator (AWG) 22, an oscilloscope (OSC) 24, a duplexer 26, a high power amplifier (HPA) 28, a low noise amplifier (LNA) 30, and a bandpass filter (BPF) 32, with signals transmitted and received via antenna 34. A clock circuit 11 includes a rubidium clock 12 for generating a precision 10 MHz timebase signal to phase-lock all the instruments locally, a clock generator 14 to generate a square wave to trigger both the AWG 22 and OSC 24 after a suitable amount of delay generated by a delay generator 16. The OSC 24 is used here as an alternative to an analog-to-digital converter (ADC) to digitize incoming signals. The signal is then time-reversed by the computer 18, and the waveform is loaded on the AWG 22. At each trigger signal at a given period, the AWG 22 emits the time-reversed waveform.

The configuration shown in FIG. 6 may be used for both Nodes and TRMs interchangeably. For example, the nodes receiving precision time from a CO as shown in FIGS. 3-5 may not need a time reversal process. On the other hand, a TRM at a CO may not need a delay generator.

Figure 7:
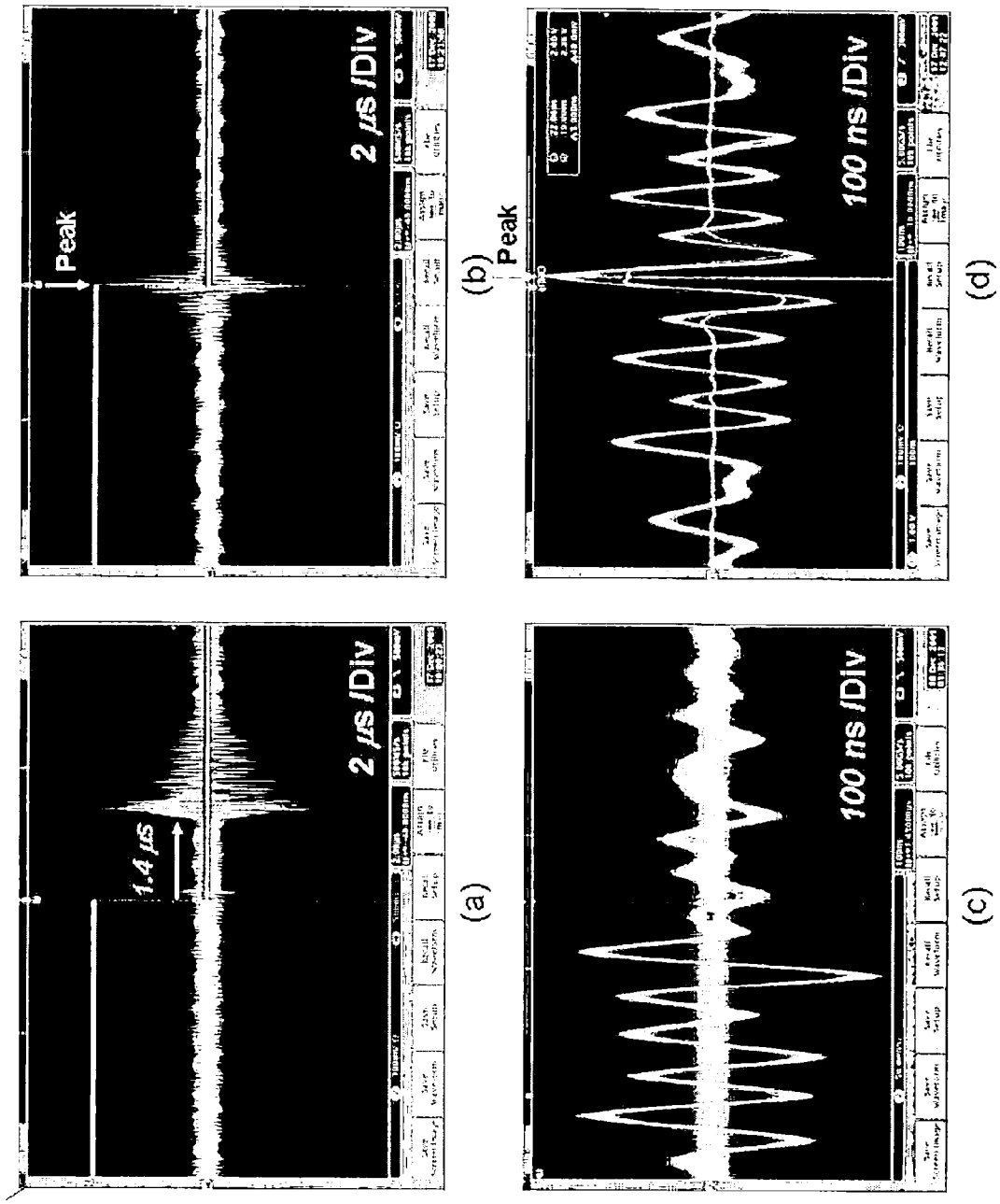
FIGS. 7A-D are screen displays showing the experimental results using the apparatus of FIG. 6 according to the invention.

The configuration of FIG. 6 was constructed using COTS components to demonstrate that the time reversal-based time transfer (TT TRM) invention cancels out propagation delays, and was used for both User and Reference Nodes, while noting, that the User Node does not perform time reversal and the Reference Node does not need a delay generator to adjust the time skew. In order to focus on the effects of propagation delays, the time skew between the User and the Reference Nodes was set to 0. FIG. 7A shows the received signal at the Reference Node. The signal was delayed by 1.4 μs (the propagation time through the RF cables and free space) and was distorted due to multipath and other distortion effects. A 20 times magnified view is shown in FIG. 7C. FIG. 7B shows the returned signal at the User after the round trip. As shown, the returned signal had a peak at 0 (center) and symmetric with respect to the peak, as can be seen more clearly in the magnified view in FIG. 7D. The position of the peak can be easily and precisely located without ambiguity, as explained previously.

FIG. 7D also shows the effects of the pathlength difference between the nodes. Another connection between the two nodes was made with a short (one ft long) cable. Although the pathlengths between the two different connections are different by 1.4 µs in time, both signals arrived at the User almost at the same time. The time difference of 3 ns is attributed to the drift of the Rubidium clock while the connection between the two nodes was manually switched. If fast electronic switching is used, the time difference is expected to be negligible. This result clearly demonstrates that the TT TRM system and method of the invention substantially cancel all or at least most of the propagation delays and detect only the desired time skew with great precision.

Figure 8:
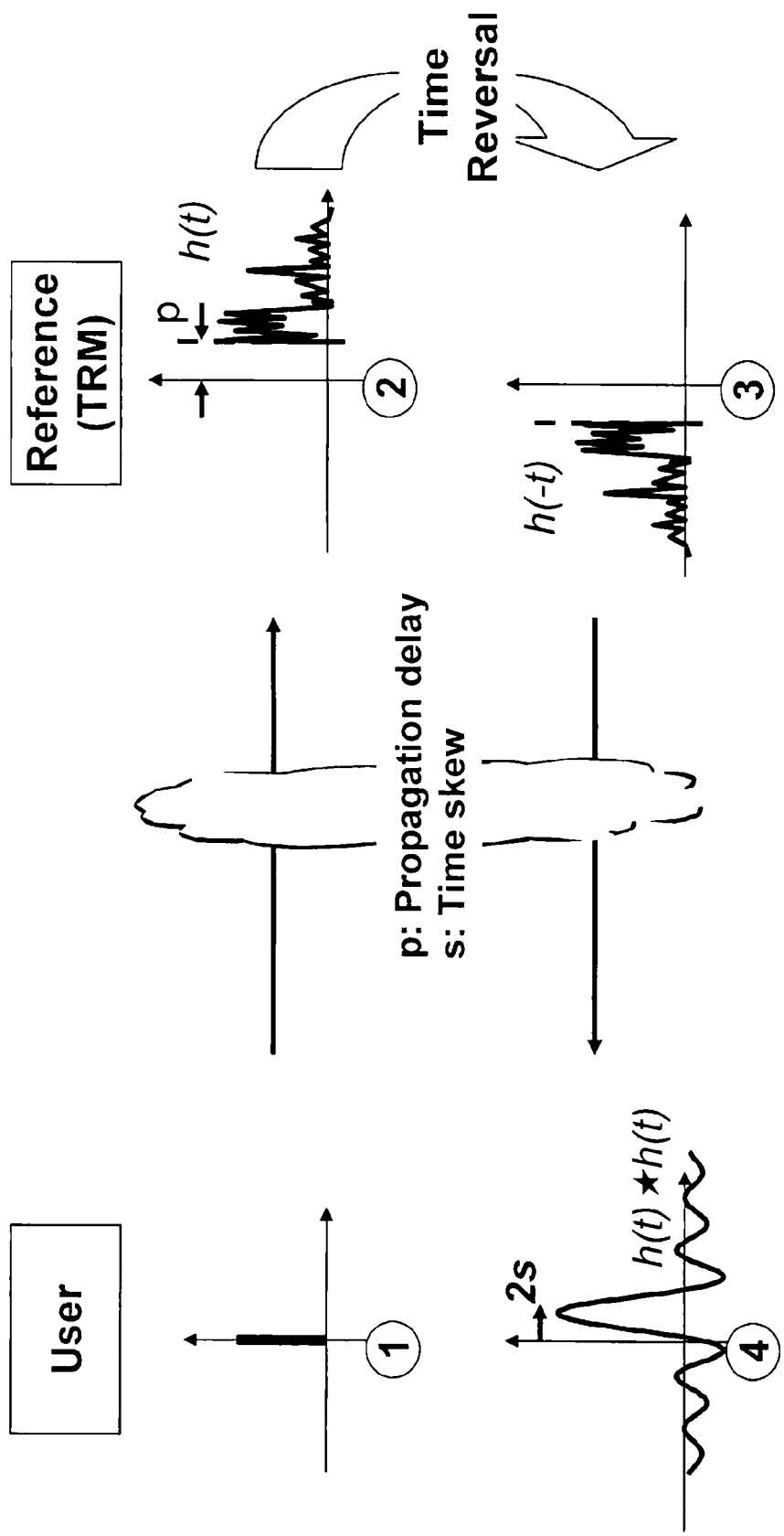
FIG. 8 is a schematic overview of the experimental setup according to the invention.

FIG. 8 shows an overview of the experimental setup to prove the p (propagation delay) independence of the signal received by the User after time reversal, as explained above. A series of short impulses are generated at a period of 100 µs (or 10 KHz repetition rate) and is transmitted from the User to the Reference Node through an RF cable (1000 ft long) and through free space (200 ft). The signal is delayed by the propagation time of about 1.4 µs before arriving at the Reference Node. The signal is also distorted by multipath effects and the antenna responses. The distorted signal waveform is represented by h(t), which is the impulse response of the transmission system connecting the two nodes. The signal received by the Reference Node is digitized, time reversed, and retransmitted to the User. The signal received by the User is given by autocorrelation h(t)★h(t), where ★ represents correlation.

It should be noted that the computer-generate time-reversed signal can be generated by executing one or more sequences of one or more computer-readable instructions read into a memory of the computer from volatile or non-volatile computer-readable media capable of storing and/or transferring computer programs or computer-readable instructions for execution by the computer. Volatile computer readable media that can be used can include a compact disk, hard disk, floppy disk, tape, magneto-optical disk, PROM (EPROM, EEPROM, flash EPROM), DRAM, SRAM, SDRAM, or any other magnetic medium; punch card, paper tape, or any other physical medium. Non-volatile media can include a memory such as a dynamic memory in a computer. In addition, computer readable media that can be used to store and/or transmit instructions for carrying out methods described herein can include non-physical media such as an electromagnetic carrier wave, acoustic wave, or light wave such as those generated during radio wave and infrared data communications.

Obviously many modifications and variations of the present invention are possible in the light of the above teachings. For example, to increase the precision further, conventional techniques such as closure phase, pseudo range, or time integration methods may be employed in this system. To support multiple nodes without crosstalk, an array of TRM's may be used to selectively focus the beam on the desired node. The TRM in FIG. 6 may be integrated into a compact box using FPGA and DSP chips. It is therefore to be understood that the scope of the invention should be determined by referring to the following appended claims.

What is claimed as new and desired to be protected by Letters Patent of the United States is:

1. A method of time-transfer of a reference clock between a first node and a second node at a distance from the first node, comprising:
   at the first node transmitting as an original signal a series of short pulses repeatedly at a period T;
   receiving the series of short pulses at the second node;
   at the second node retransmitting the series of short pulses at the same period T as a return signal toward the first node;
   receiving the return signal at the first node;
   comparing the return signal with an imaginary time-reversed version of the original signal;
   computing a delay between the return signal and the imaginary version that is substantially equal to twice the time difference between the two nodes; and
   applying the computed delay to a clock input calibration for a desired signal.

2. The method of claim 1, wherein the desired signal is a multistatic radar signal.

3. The method of claim 1, wherein:
   the desired signal is a lower power continuous wave signal;
   the return signal is convolved with the original signal to produce a convolved signal; and
   further comprising applying pulse compression to the convolved signal.

4. The method of claim 1, wherein a Time Reverse Mirror (TRM) being operated at the pre-defined period T is located at a central office (CO) capable of operating independently without the need for communication or coordination with each node and with a different frequency used at each node.

5. The method of claim 1, wherein a central office (CO) has a plurality of Time Reverse Mirrors (TRM's) and the transceiver transmits with selective beam focusing with the same frequency used at each node.

6. A Time Transfer Time Reverse Mirror (TT TRM) system, comprising:
   a radio transceiver including an antenna for transmitting as an original signal a series of short pulses repeatedly at a period T and for receiving from a remote node a return signal that is a retransmission of the original signal at the same period T;
   a clock circuit for inputting a clock signal to the transceiver; and
   a computer, including a machine-readable storage media having programmed instructions stored thereon for:
      computing and generating an imaginary time-reversed signal version of the original signal;
      comparing the return signal with the imaginary version;
      computing a delay between the return signal and the imaginary version that is substantially equal to twice the time difference between the two nodes; and
   applying the computed delay to a clock input calibration for a desired signal.

7. The TT TRM system of claim 6, wherein the transceiver comprises:
   an arbitrary waveform generator;
   an oscilloscope;
   a duplexer;
   a high power amplifier;
   a low noise amplifier; and
   a bandpass filter.

8. The TT TRM system of claim 6, wherein the clock circuit comprises:
   a rubidium clock;
   a clock generator; and
   a delay generator.

9. The TT TRM system of claim 6, wherein the desired signal is a multistatic radar signal.

* * * * *